US012155161B2

(12) United States Patent
Huang et al.

(10) Patent No.: US 12,155,161 B2
(45) Date of Patent: Nov. 26, 2024

(54) HYBRID ELECTRICAL CONNECTOR AND ELECTRICAL CONNECTOR ASSEMBLY

(71) Applicant: TYCO ELECTRONICS TECHNOLOGY (SIP) LTD., Jiangsu Province (CN)

(72) Inventors: Jianlin Huang, Suzhou (CN); Feng (Carlos) Pan, Suzhou (CN)

(73) Assignee: TYCO ELECTRONICS TECHNOLOGY (SIP) LTD., Jiangsu Province (CN)

( * ) Notice: Subject to any disclaimer, the term of this patent is extended or adjusted under 35 U.S.C. 154(b) by 290 days.

(21) Appl. No.: 17/572,758

(22) Filed: Jan. 11, 2022

(65) Prior Publication Data

US 2022/0224064 A1 Jul. 14, 2022

(30) Foreign Application Priority Data

Jan. 14, 2021 (CN) ......................... 202120103087.0

(51) Int. Cl.
*H01R 24/64* (2011.01)
*H01R 12/71* (2011.01)
(Continued)

(52) U.S. Cl.
CPC ........... *H01R 24/64* (2013.01); *H01R 12/716* (2013.01); *H01R 13/40* (2013.01); *H01R 13/502* (2013.01);
(Continued)

(58) Field of Classification Search
CPC ...... H01R 24/64; H01R 12/716; H01R 13/40; H01R 13/502; H01R 13/5202;
(Continued)

(56) References Cited

U.S. PATENT DOCUMENTS 9,178,318 B2 * 11/2015 Rascon .............. H01R 13/6581
2002/0146940 A1 * 10/2002 Colantuono ......... H01R 12/716 439/676

(Continued)

FOREIGN PATENT DOCUMENTS

CN 109193270 A * 1/2019

*Primary Examiner* — Justin M Kratt
(74) *Attorney, Agent, or Firm* — Potomac Law Group, PLLC

(57) ABSTRACT

The present invention provides a hybrid electric connector and an electric connector assembly. The hybrid electrical connector has: a connection body having a mating end, a connecting end, and a mating connection part; and a plurality of connection terminals provided on the connection body. The mating connection part is provided with a mating cavity with an opening at the mating end, one end of the connection terminal extends to the mating end, and the other end extends to the connecting end, the plurality of connection terminals have a first connection terminal and a second connection terminal, the first connection terminal is configured to transmit Ethernet signals, and the second connection terminal is configured to transmit non Ethernet signals. Compared with the prior art, the hybrid electrical connector of the present invention is provided with a first connection terminal for transmitting Ethernet signals and a second connection terminal for transmitting non Ethernet signals, so that the hybrid electrical connector of the present invention can transmit a variety of electrical signals and improve the compatibility of the hybrid electrical connector.

12 Claims, 4 Drawing Sheets

(51) Int. Cl.

| | |
|---|---|
| ***H01R 13/40*** | (2006.01) |
| ***H01R 13/502*** | (2006.01) |
| ***H01R 13/52*** | (2006.01) |
| ***H01R 13/6582*** | (2011.01) |
| *H01R 13/405* | (2006.01) |
| *H01R 13/6581* | (2011.01) |
| *H01R 13/6594* | (2011.01) |
| *H01R 24/60* | (2011.01) |
| *H01R 24/62* | (2011.01) |
| *H01R 24/70* | (2011.01) |
| *H01R 27/02* | (2006.01) |

(52) U.S. Cl.
CPC ..... *H01R 13/5202* (2013.01); *H01R 13/6582* (2013.01); *H01R 13/405* (2013.01); *H01R 13/52* (2013.01); *H01R 13/6581* (2013.01); *H01R 13/6594* (2013.01); *H01R 24/60* (2013.01); *H01R 24/62* (2013.01); *H01R 24/70* (2013.01); *H01R 27/02* (2013.01); *H01R 2201/26* (2013.01)

(58) Field of Classification Search
CPC .. H01R 13/6582; H01R 13/405; H01R 13/52; H01R 13/6581; H01R 13/6594; H01R 24/60; H01R 24/62; H01R 24/70; H01R 27/02; H01R 2201/26
See application file for complete search history.

(56) References Cited

U.S. PATENT DOCUMENTS

2018/0233868 A1* 8/2018 Hachadorian ...... H01R 13/5213
2021/0167548 A1* 6/2021 Lin .................... H01R 13/6271

* cited by examiner

HYBRID ELECTRICAL CONNECTOR AND ELECTRICAL CONNECTOR ASSEMBLY

CROSS-REFERENCE TO RELATED APPLICATION

This application claims the benefit of Chinese Patent Application No. 202120103087.0 filed on Jan. 14, 2021, in the State Intellectual Property Office of China, the whole disclosure of which is incorporated herein by reference.

BACKGROUND OF THE INVENTION

Field of the Invention

The present invention relates to a technical field of connectors, in particular to a hybrid electrical connector and an electrical connector assembly.

Description of the Related Art

In the prior art, an electrical connection is generally achieved by electrical connectors. With the rapid development of electronic products, the requirements of electrical connection are becoming more and more diversified. In particular, in some electromechanical products, such as automobiles, it is necessary to transmit a variety of electrical signals. Because the existing electrical connectors are difficult to transmit a variety of electrical signals, it is necessary to set a variety of electrical connectors, which will undoubtedly greatly increase the production cost and assembly efficiency.

SUMMARY OF THE INVENTION

The present invention has been made to overcome or alleviate at least one aspect of the above-mentioned disadvantages.

According to an aspect of the present invention, there is provided a hybrid electrical connector, comprising: a connection body having a mating end, a connecting end, and a mating connection part; and a plurality of connection terminals provided on the connection body, the mating connection part is provided with a mating cavity with an opening at the mating end, one end of the connection terminal extends to the mating end, and the other end extends to the connecting end, the plurality of connection terminals include a first connection terminal and a second connection terminal, the first connection terminal is configured to transmit Ethernet signals, and the second connection terminal is configured to transmit non Ethernet signals.

According to an exemplary embodiment of the present invention, the mating connection part forms a single mating cavity, and the plurality of connection terminals are arranged in the mating cavity.

According to another exemplary embodiment of the present invention, the mating connection part is protruded at the mating end and adapted to mate with a single mating connector.

According to another exemplary embodiment of the present invention, the connection body has a plurality of mating connection parts for mating with different mating connectors, the plurality of mating cavities of the plurality of mating connection parts are separated from each other.

According to another exemplary embodiment of the present invention, the plurality of mating connection parts are protruded at the mating end and separated from each other; all the first connection terminals are arranged in one of the plurality of mating connection parts and configured to transmit Ethernet signals, and the second connection terminal is configured to transmit at least one of power supply signals and ordinary electrical signals.

According to another exemplary embodiment of the present invention, the connection body is provided with two mating connection parts, and the first connection terminal and the second connection terminal correspond to the two mating connection parts, respectively.

According to another exemplary embodiment of the present invention, the hybrid electrical connector further comprises a shield provided on the connection body and at least partially surrounding a part of the connection terminals for transmitting Ethernet signals.

According to another exemplary embodiment of the present invention, the connection body is an integral molded part which is molded on the connection terminal and the shield in an embedded injection molding manner.

According to another exemplary embodiment of the present invention, the shield is U-shaped or ring-shaped in a transverse direction.

According to another exemplary embodiment of the present invention, the shield is provided with a ground terminal, and one end of the ground terminal extends to the connecting end.

According to another exemplary embodiment of the present invention, the shield is provided with a positioning notch.

According to another exemplary embodiment of the present invention, the connection body further comprises a mounting part which protrudes in a radial direction to be fixed on a electronic device; the hybrid electrical connector further comprises a bushing provided on the mounting part, the bushing is used to cooperate with a locking connection component to fix the mounting part on the electronic device; the connection body is an integral molded part which is molded on the bushing in an embedded injection molding manner.

According to another exemplary embodiment of the present invention, the hybrid electrical connector further comprises a sealing ring provided on the mounting part, the sealing ring is arranged at the connecting end and around the plurality of connection terminals and the shield.

According to another aspect of the present invention, there is provided an electrical connector assembly, comprising: a circuit board; and the above hybrid electrical connector, one ends of the plurality of connection terminals protrude from the connecting end to be connected with the circuit board.

According to an exemplary embodiment of the present invention, the electrical connector assembly further comprises a mating connector connected with the hybrid electrical connector at the mating end.

Compared with the prior art, the beneficial effect of the hybrid electrical connector provided by the present invention is that the hybrid electrical connector of the present invention is provided with a first connection terminal for transmitting Ethernet signals and a second connection terminal for transmitting non Ethernet signals, so that the hybrid electrical connector of the present invention can transmit a variety of electrical signals, and the compatibility of hybrid electrical connector is improved.

Compared with the prior art, the beneficial effect of the electrical connector assembly provided by the present invention is that the electrical connector assembly of the present invention includes the above hybrid electrical connector, and the hybrid electrical connector can transmit a variety of electrical signals.

BRIEF DESCRIPTION OF THE DRAWINGS

The above and other features of the present invention will become more apparent by describing in detail exemplary embodiments thereof with reference to the accompanying drawings, in which.

wherein, the reference numerals in the figures are.

Figure 1:
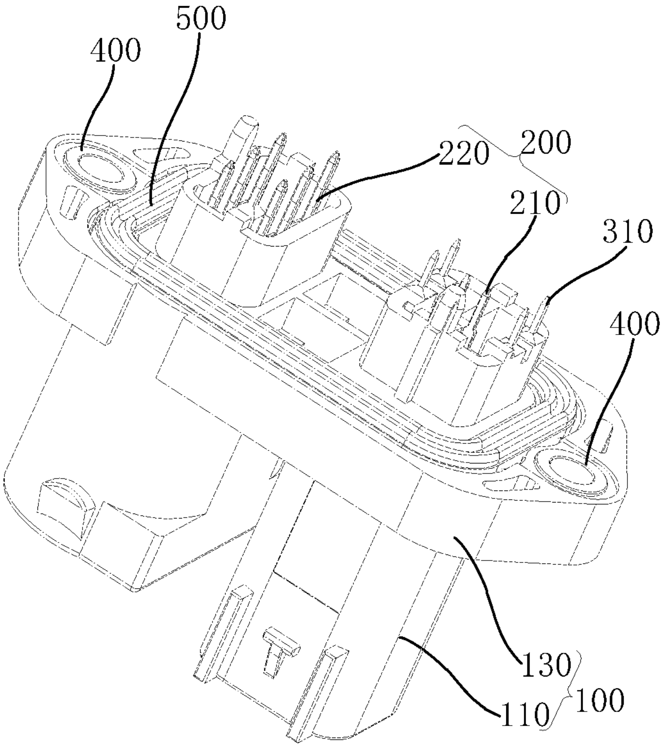
FIG. 1 is an illustrative three-dimensional structural view of an electrical connector according to an embodiment of the present invention.

100—connection body; 110—mating connection part; 111—mating cavity; 130—mounting part; 131—sink; 200—connection terminal; 210—first connection terminal; 220—second connection terminal; 300—shield; 310—ground terminal; 320—positioning notch; 400—bushing; 500—sealing ring; 600—fool proof structure; 700—mating connector.

DETAILED DESCRIPTION OF PREFERRED EMBODIMENTS

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In order to make the technical problems to be solved by the present invention, technical solutions and beneficial effects more clear, the present invention is further described in detail below in combination with the accompanying drawings and embodiments. It should be understood that the specific embodiments described herein are only used to explain the present invention and are not used to limit the present invention.

It should be noted that when an element is called "fixed to" or "provided on" another element, it can be directly or indirectly on another element. When an element is called "connected to" another element, it can be directly connected to another element or indirectly connected to another element.

It should be understood that the orientation or positional relationship indicated by the terms "length", "width", "upper", "lower", "front", "rear", "left", "right", "vertical", "horizontal", "top", "bottom", "inner", "outer" and so on is based on the orientation or positional relationship shown in the attached drawings, only for the convenience of describing the present invention and simplifying the description, rather than indicating or implying that the device or element must have a specific orientation, be constructed and operated in a specific orientation, and it cannot be understood as a limitation of the present invention.

In addition, the terms "first" and "second" are only used for descriptive purposes and cannot be understood as indicating or implying relative importance or implicitly indicating the number of indicated technical features. Thus, the features defining "first" and "second" may explicitly or implicitly include one or more of the features. In the description of the present invention, "multiple" means two or more, unless otherwise specifically defined.

Figure 2:
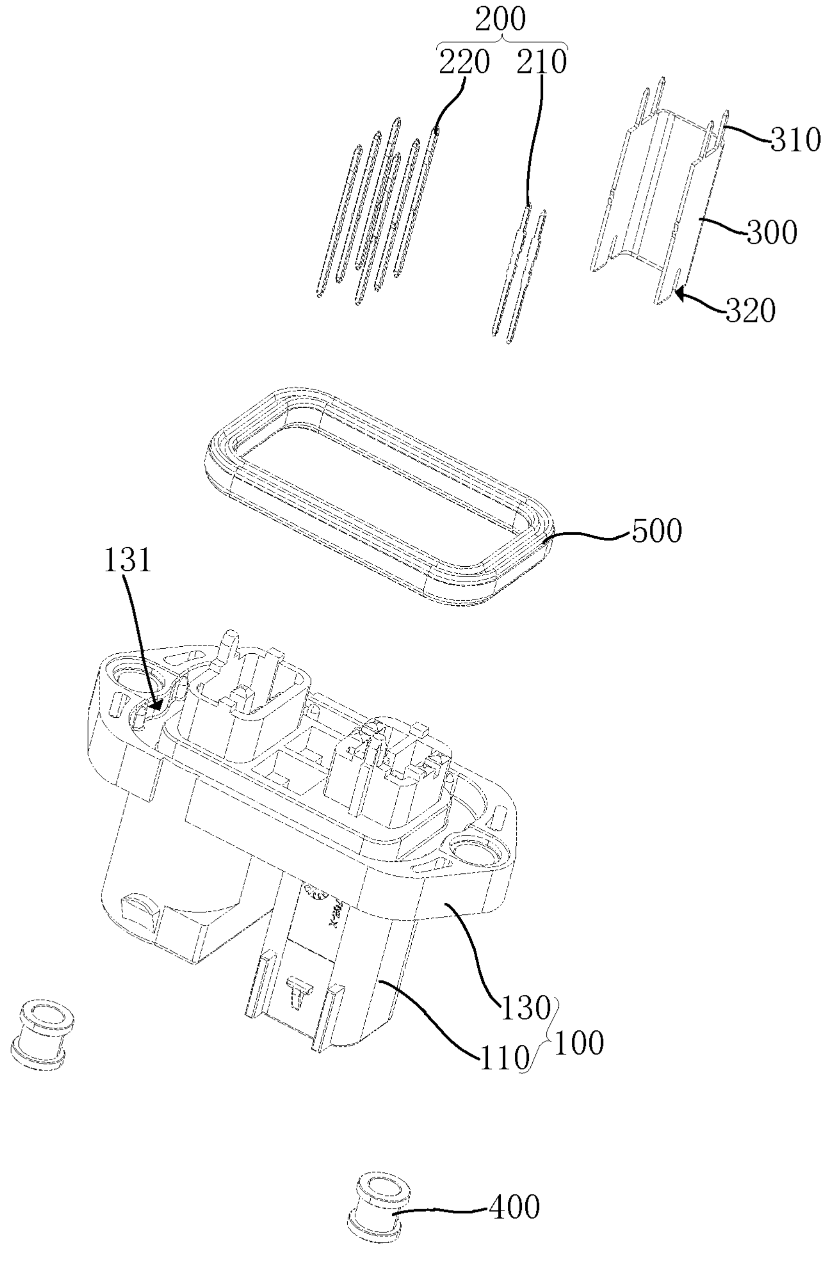
FIG. 2 is an illustrative exploded structure view of an electrical connector according to an embodiment of the present invention.
Figure 3:
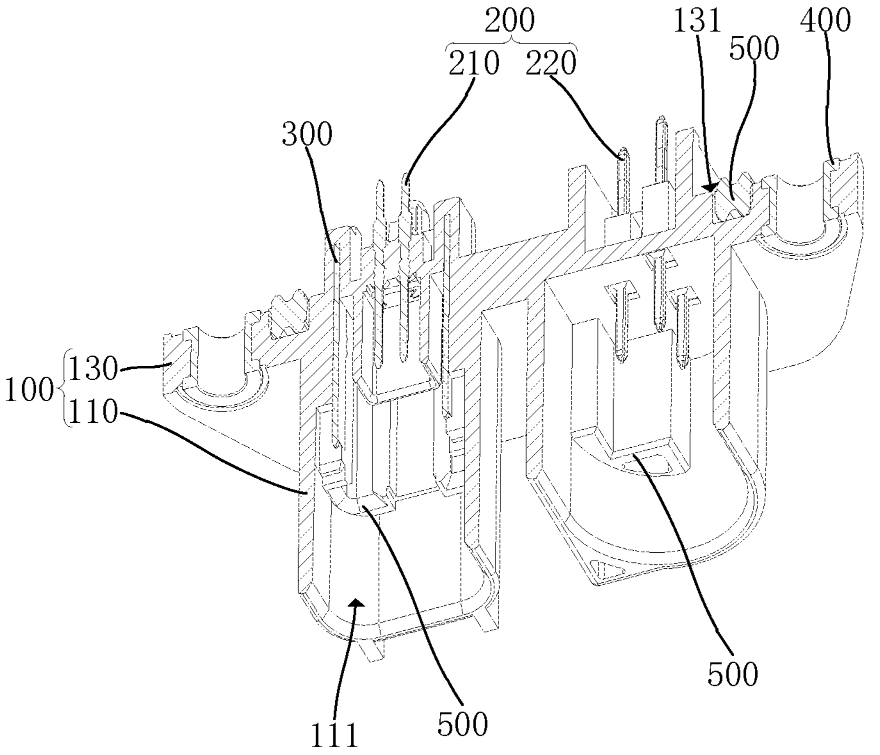
FIG. 3 is an illustrative cross-sectional structural view of an electrical connector according to an embodiment of the present invention.

Referring to FIGS. 1 to 3, the embodiment of the present invention provides a hybrid electrical connector, comprising a connection body 100 and a plurality of connection terminals 200. The connection body 100 has a mating end, a connecting end, and a mating connection part 110. The mating connection part 110 is provided with a mating cavity 111 with an opening at the mating end. A plurality of connection terminals 200 are provided on the connection body 100, one end of the connection terminal 200 extends to the mating end, and the other end extends to the connection end; The plurality of connection terminals 200 include a first connection terminal 210 and a second connection terminal 220, the first connection terminal 210 is configured to transmit Ethernet signals, and the second connection terminal 220 is configured to transmit non Ethernet signals.

Compared with the prior art, the beneficial effect of the hybrid electrical connector of the embodiment of the present invention is that the hybrid electrical connector of the embodiment of the present invention is provided with a first connection terminal 210 for transmitting Ethernet signals and a second connection terminal 220 for transmitting non Ethernet signals, so that the hybrid electrical connector of the present invention can transmit a variety of electrical signals, and the compatibility of hybrid electrical connector is improved.

Figure 4:
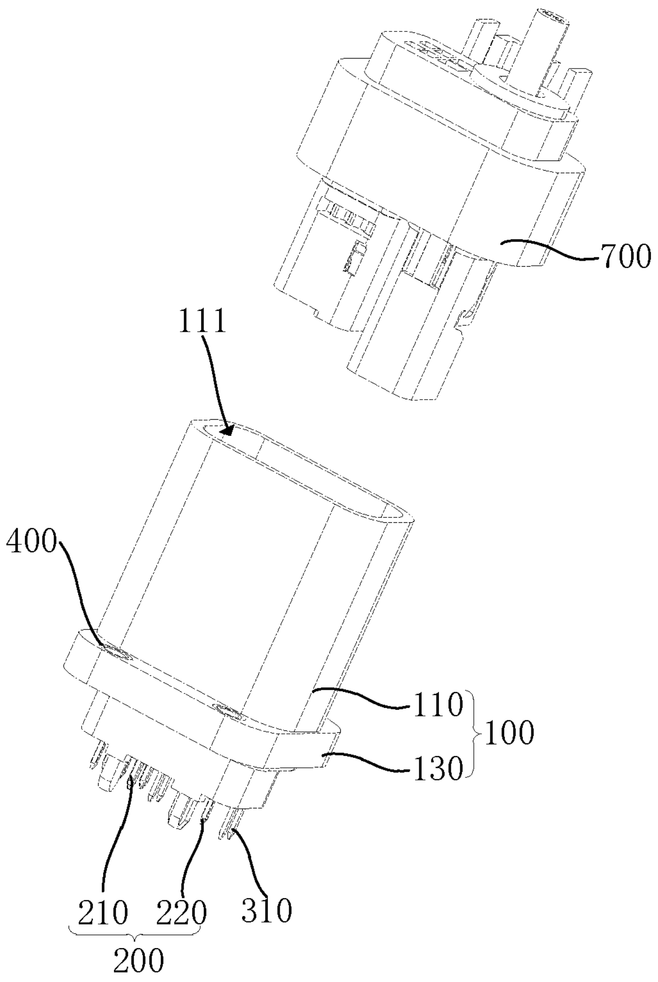
FIG. 4 is an illustrative structural view of an electrical connector assembly according to an embodiment of the present invention.

In an embodiment of the present invention, as shown in FIG. 4, the mating connection part 110 is formed with a single mating cavity 111, a plurality of connection terminals 200 are arranged in the mating cavity 111, and the mating cavity 111 is used for mating with a mating connector 700. By inserting the mating connector 700 into the corresponding mating cavity 111, the connection terminal 200 can be electrically connected with the corresponding mating connector 700.

In an embodiment of the present invention, as shown in FIG. 4, the mating connection part 110 is protruded at the mating end to facilitate plug-in connection with the single mating connector 700. With this structure, the hybrid electrical connector is easy to connect with the mating connector 700.

In an embodiment of the present invention, as shown in FIGS. 1 to 3 and in combination with FIG. 4, the connection body 100 has a plurality of mating connection parts 110 for mating with different mating connectors 700, respectively; A plurality of mating cavities 111 of the plurality of mating connection parts 110 are arranged separately from each other. In this structure, by setting a plurality of mating connection parts 110 in the connection body 100 so that the mating cavities 111 of the mating connection parts 110 are separated from each other. The connection terminals 200 can be classified to facilitate the insertion of the corresponding mating connector 700 as required to realize the transmission of the corresponding electrical signals. It should be noted that the hybrid electrical connector shown in FIGS. 1 to 3 differs from the hybrid electrical connector shown in FIG. 4 only in the number of mating connection parts 110. Both hybrid electrical connectors can be mated with the mating connector 700 shown in FIG. 4.

In an embodiment of the present invention, as shown in FIGS. 1 to 3 and in combination with FIG. 4, a plurality of mating connection parts 110 are protruded at the mating end and separated from each other to facilitate plug-in connection with the corresponding mating connector 700. With this structure, the hybrid electrical connector is easy to connect with the mating connector 700.

In an embodiment of the present invention, as shown in FIGS. 1 to 3 and in combination with FIG. 4, all the first connection terminals 210 are arranged in one of the plurality of mating connection parts 110 and configured to transmit Ethernet signals, and the second connection terminal 220 is used for transmitting at least one of power supply signals and ordinary electrical signals. It can be understood that the types of electrical signals transmitted by the first connection terminal 210 and the second connection terminal 220 can be appropriately adjusted according to the selection and specific needs of the actual situation, and are not uniquely limited here.

In an embodiment of the present invention, as shown in FIGS. 1 to 3, the connection body 100 is provided with two mating connection parts 110, and the first connection terminal 210 and the second connection terminal 220 correspond to the two mating connection parts 110, respectively.

In an embodiment of the present invention, as shown in FIGS. 1 to 3, the hybrid electrical connector also includes a shield 300. The shield 300 can be, but is not limited to, a metal part. The shield 300 is arranged on the connection body 100 and at least partially surrounds a part of the connection terminals 200 for transmitting Ethernet signals, so as to prevent interference when transmitting Ethernet signals.

In an embodiment of the present invention, the connection body 100 is an integral molded part which is molded on the connection terminal 200 and the shield 300 in an embedded injection molding manner. That is, the connection body 100 is injection molded, and during the injection molding of the connection body 100, the connection terminal 200 and the shield 300 are directly fixed on the connection body 100. Therefore, the connection terminal 200 and the shield 300 and the connection body 100 do not need to be assembled together through additional assembly steps. There is no gap at the connection between the connection terminal 200 and the shield 300 and the connection body 100, which will not lead to dust accumulation. It can effectively improve the electrical connection capacity of the electrical connector and reduce the signal transmission error.

The production method of the electrical connector according to an embodiment of the present invention comprises steps of: providing a mold for producing the connection body 100; placing the connection terminal 200 and the shield 300 in the mold; injecting molten raw material into the mold; pressuring the molten raw material in the mold to compact the molten raw material and increase the plastic density to compensate for the shrinkage behavior of the plastic; Finally, cooling and opening the mold to obtain the connection body 100 fixed with the connection terminal 200 and the shield 300.

In an embodiment of the present invention, the shield 300 is U-shaped in a transverse direction. Of course, according to the selection and specific needs of the actual situation, the shield 300 can also be ring-shaped in the transverse direction, so as to improve the shielding capacity of the shield 300.

In an embodiment of the present invention, as shown in FIG. 2 and FIG. 3, the shield 300 is provided with a ground terminal 310. One end of the ground terminal 310 extends to the connecting end. With this structure, the ground terminal 310 is used for grounding, so as to reduce the impact of strong interference on Ethernet signals.

In an embodiment of the present invention, as shown in FIG. 2 and FIG. 3, the shield 300 is provided with a positioning notch 320. With this structure, when the connection body 100 is injection molded, the positioning notch 320 of the shield 300 can cooperate with a positioning column of the mold, so that the shield 300 is fixed at the corresponding position of the connecting body 100, so as to avoid the dislocation of the shield 300 and effectively improve the production efficiency and product yield.

In an embodiment of the present invention, as shown in FIG. 1 to FIG. 3, the connection body 100 also includes a mounting part 130 protruding along the radial direction, the mounting part 130 is used for fixing on an electronic device. The hybrid electrical connector also includes a bushing 400 arranged on the mounting part 130, the bushing 400 is used to cooperate with a locking connection component to fix the mounting part 130 on the electronic device. In this embodiment, the locking connection component can be, but is not limited to, a screw which passes through the bushing 400 and is screwed on the electronic device, so as to fix the electrical connector on the electronic device. It can be understood that according to the selection and specific needs of the actual situation, the hybrid electrical connector can be fixed on the electronic device by other means, which is not uniquely limited here.

In an embodiment of the present invention, the connection body 100 is an integral molded part which is molded on the bushing 400 in an embedded injection molding manner. That is, the connection body 100 is injection molded, and in the injection molding process of the connection body 100, the connection terminal 200, the shield 300 and the bushing 400 are directly fixed on the connection body 100. Therefore, the bushing 400 and the connection body 100 do not need to be assembled together by an additional assembly step, which simplifies the production process. It is conducive to improving production capacity.

In an embodiment of the present invention, as shown in FIGS. 2 and 3, the electrical connector also includes a sealing ring 500 provided on the mounting part 130. The sealing ring 500 is arranged at the connecting end and around the plurality of connection terminals 200 and the shield 300. With this structure, when the hybrid electrical connector is installed on the electronic device, the sealing ring 500 is interference fit between the mounting part 130 and the electronic device, so that the hybrid electrical connector is hermetically connected with the electronic device, which is conducive to improving the stability of the electrical connection capacity of the electrical connector.

In an embodiment of the present invention, as shown in FIG. 3, the mounting part 130 is provided with a sink 131, and the sealing ring 500 is partially arranged in the sink 131. With this structure, the sink 131 can position and fix the sealing ring 500, which is conducive to improving the assembly efficiency of the electrical connector.

In an embodiment of the present invention, as shown in FIG. 3, a fool proof structure 600 is provided in the mating cavity 111. With this structure, it can avoid the damage of the electrical connector or other adverse consequences caused by the operator's assembly error. In this embodiment, the fool proof structure 600 is convex. Of course, according to the selection and specific needs of the actual situation, the fool proof structure 600 can also be a groove, which is not uniquely limited here.

Referring to FIGS. 1 to 4, the embodiment of the present invention also provides an electrical connector assembly. The electrical connector assembly comprises a circuit board (not shown) and a hybrid electrical connector as described above. One end of the plurality of connection terminals 200 protrudes from the connecting end to connect with the circuit board.

In an embodiment of the present invention, as shown in FIG. 4, the electrical connector assembly also includes a mating connector 700, which is inserted into and mated with the hybrid electrical connector at the mating end.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A hybrid electrical connector, comprising:

a connection body having a mating end, a connecting end, and a mating connection part; and a plurality of connection terminals provided on the connection body, wherein the mating connection part is provided with a mating cavity with an opening at the mating end, wherein one end of the connection terminal extends to the mating end, and the other end extends to the connecting end, wherein the plurality of connection terminals comprise a first connection terminal and a second connection terminal, the first connection terminal is configured to transmit Ethernet signals, and the second connection terminal is configured to transmit non Ethernet signals;

wherein the connection body further comprises a mounting part which protrudes in a radial direction to be fixed on an electronic device;

wherein the hybrid electrical connector further comprises a bushing provided on the mounting part, the bushing is used to cooperate with a locking connection component to fix the mounting part on the electronic device;

wherein the connection body is an integral molded part which is molded on the bushing in an embedded injection molding manner.

2. The hybrid electrical connector according to claim 1, comprising:

the mating connection part is a plurality of mating connection parts, the plurality of mating connection parts are arranged separately from each other and protrude from the mating end in a direction away from the connecting end; and wherein each of the plurality of mating connection parts is provided with a mating cavity with an opening at the mating end;

wherein the first connection terminal is provided in a first mating connection part of the plurality of mating connection parts and the second connection terminal is positioned in a second mating connection part of the plurality of mating connection parts.

3. The hybrid electrical connector according to claim 2, wherein the mating connection parts is-protruded at the mating end and are adapted to mate with one or more mating connectors.

4. The hybrid electrical connector according to claim 2, wherein the plurality of mating connection parts are configured to mate with different mating connectors, the plurality of mating cavities of the plurality of mating connection parts are separated from each other.

5. The hybrid electrical connector according to claim 4, wherein the plurality of mating connection parts are protruded at the mating end and separated from each other;

wherein all the first connection terminal comprises a plurality of first connection terminals that are arranged in one of the plurality of mating connection parts and configured to transmit Ethernet signals, and the second connection terminal is configured to transmit at least one of power supply signals and ordinary electrical signals.

6. The hybrid electrical connector according to claim 5, wherein the connection body is provided with two mating connection parts, and the first connection terminal and the second connection terminal correspond to the two mating connection parts, respectively.

7. The hybrid electrical connector according to claim 2, further comprising:

a shield provided on the connection body and at least partially surrounding a part of the connection terminal for transmitting Ethernet signals.

8. The hybrid electrical connector according to claim 7, wherein the connection body is an integral molded part which is molded on the connection terminal and the shield in an embedded injection molding manner.

9. The hybrid electrical connector according to claim 7, wherein the shield is U-shaped or ring-shaped in a transverse direction.

10. The hybrid electrical connector according to claim 7, wherein the shield is provided with a ground terminal, and one end of the ground terminal extends to the connecting end.

11. The hybrid electrical connector according to claim 7, wherein the shield is provided with a positioning notch.

12. The hybrid electrical connector according to claim 1, further comprising:

a sealing ring provided on the mounting part, wherein the sealing ring is arranged at the connecting end and around the plurality of connection terminals and the shield.

* * * * *